United States Patent [19]

Peasley et al.

[11] Patent Number: 5,689,682
[45] Date of Patent: Nov. 18, 1997

[54] COMPUTERIZED FLIGHT SIMULATION CONTROL SAMPLING AND PRODUCTION SYSTEM AND METHOD

[75] Inventors: Mark E. Peasley; Hugh Diedrichs; Cyrus R. Kanga; Edwin W. Wise, all of Eugene, Oreg.

[73] Assignee: Dynamix, Inc., Eugene, Oreg.

[21] Appl. No.: 399,841

[22] Filed: Mar. 7, 1995

[51] Int. Cl.[6] .............................. G06F 17/17; G09B 9/12
[52] U.S. Cl. ...................... 395/500; 395/173; 395/175; 395/509; 364/578; 364/146; 364/474.31; 434/37
[58] Field of Search .................. 364/424.06, 578, 364/188, 146, 178, 474.31, 577; 395/152, 500, 155, 118, 173, 174, 175, 509, 523; 348/123; 273/313, 310, 317; 434/36, 37

[56] References Cited

U.S. PATENT DOCUMENTS

| | | | |
|---|---|---|---|
| 3,574,262 | 4/1971 | Bowker et al. | 434/44 |
| 3,899,662 | 8/1975 | Kreeger et al. | 395/138 |
| 4,078,317 | 3/1978 | Wheatley et al. | 434/43 |
| 4,599,070 | 7/1986 | Hladky et al. | 434/45 |
| 4,811,245 | 3/1989 | Bunker et al. | 395/129 |
| 4,864,517 | 9/1989 | Maine et al. | 345/201 |
| 4,952,051 | 8/1990 | Lovell et al. | 352/87 |
| 4,952,152 | 8/1990 | Briggs et al. | 434/69 |
| 5,214,758 | 5/1993 | Ohba et al. | 395/164 |
| 5,396,267 | 3/1995 | Bouton | 345/168 |
| 5,415,549 | 5/1995 | Logg | 364/578 |
| 5,502,807 | 3/1996 | Beachy | 395/173 |

OTHER PUBLICATIONS

Kim et al., "Fast Frame-To-Frame Interpolation Technique For Scenes Containing Moving Objects", Electronics Letters, Sep. 1991, pp. 1788–1790.
Bob, "Flight of the Intruder", Compute Mar. 3, 1991, pp. 90 and 92.
Owen et al., "Modelling and Interpolating Cartoon Characters", IEEE 1994, pp. 148–155.
Sherman, "Animating Your Training", Presentation Technologies, Nov. 1994, pp. 1 and 2.

Primary Examiner—Kevin J. Teska
Assistant Examiner—Tan Nguyen
Attorney, Agent, or Firm—Kolisch, Hartwell, Dickinson, McCormack & Heuser

[57] ABSTRACT

A high-quality motion simulation based on the sampled simulated motion of a piloted object or vehicle and a system to provide visual information to teach a user how to manipulate the object's controls to achieve the displayed motion. The invented method includes piloting the object, periodically sampling various characteristics of the object while it is in motion, providing the sampled information to a processor, interpolating additional characteristics of the object that represent its motion and position between chronologically adjacent pieces of sampled information, and rendering an apparently smooth presentation of the object's motion. The invented method may also include presenting the control parameters used to produce such motion in order to teach a viewer how to manipulate the controls to achieve the desired motion.

20 Claims, 3 Drawing Sheets

COMPUTERIZED FLIGHT SIMULATION CONTROL SAMPLING AND PRODUCTION SYSTEM AND METHOD

TECHNICAL FIELD

This invention relates generally to the computerized production of simulated motion of an object. More particularly, this invention relates to the sampling of the motion of a computer-generated object and producing a high-quality simulation of the object's motion based on the sampling, wherein the object's motion is controlled by a pilot. In addition, this invention relates to pilot instruction by displaying the high-quality simulation along with the piloting controls used to produce the observed simulated motion.

BACKGROUND ART

When a software or computer-program publisher wants to display a dramatic and realistic (or cinematic) action sequence showing an object in motion, computer animators draw or create such an action sequence frame-by-frame or the publisher purchases video clips or footage of such an action sequence (if any exists). Many graphics-based or graphics-intensive computer programs use a cinematic action sequence. A good example of such a graphics-intensive computer program is a flight simulator or a flight simulation game.

Many computer programs include an opening or introductory action sequence that is shown to the viewer when the program begins. Such an introduction is designed to acclimate the viewer to the style or environment of the graphics program. In flight simulation programs, the introduction may be a cinematic airplane flyby, a dogfight or other flying action. Since the storage of such sequences usually requires a large share of computer resources, the sequences were not used very often in the past. However, these cinematic action sequences are used more often today because the cost of powerful processors and large-capacity secondary storage system has dramatically decreased. Such secondary storage systems include Compact Disc-Read Only Memory (CD-ROM) systems and high-speed, mass-storage conventional multi-platter hard disk drives (hard drives). Accordingly, present and future graphics-based programs will most likely use more cinematic action sequences throughout the normal operation of the program in addition to the introduction.

To produce cinematic action sequences, software publishers usually use computer animators or purchase authentic video or film footage of the desired sequence. Computer-aided animation is typically used to produce cinematic action using high-quality graphical systems. Such a high-quality graphical system usually has a high-refresh rate (faster than fifteen frames per second (frames/sec)), high resolution, and a broad color palette of various hues and tints (using twenty-four bit or thirty-two bit color depth).

Current computer-aided animation techniques have several drawbacks including high cost and lack of realism. Although computer-aided animation is typically less expensive than manual animation using traditional means, the current computer-aided animation process is still a labor intensive process and, therefore, is relatively expensive. Also, animated sequences lack an important realism element because the animator can draw the object performing any type of maneuver whether such a maneuver is realistically possible or is in accord with the natural laws. The degree of realism depicted in the animation depends upon the skill of the animator and even the highest skilled animators cannot know or effectively reproduce all of the various subtleties that an object in motion may experience. For example, if the animated object is an airplane, the computer-aided animated sequences showing a plane in flight will lack the various subtleties involved in flight physics and aerodynamics. This means that an animator may draw an airplane performing any maneuver regardless of the physical limitations of the model of plane depicted. Therefore, present computer-aided animation techniques are relatively expensive and lack realism.

Video or film footage has the desired realism because it is actual footage of an object in motion in the real world, such as an aircraft in flight. The publisher's search for the appropriate film footage showing the desired action sequence is often a difficult and expensive proposition. For example, it is a difficult chore to find footage of the proper airplane model performing the desired maneuver in the proper setting or environment. If such footage is ever found, then its use may have to be authorized by the copyright owner. The search and acquisition of the desired footage is a time-consuming and expensive processes.

Turning away from cinematic action sequences for a moment, the user of a simulation program traditionally learns to pilot or operate a simulated vehicle or object by reading textual instructions found in the manual accompanying the simulation system or program and by repetitive practice. However, many people learn better by watching a teacher or an expert perform. Unfortunately, such a teacher or expert is typically not available in a simulation system or program.

Accordingly, a quicker animation or production system and method is needed in order to increase the realism while reducing the time and costs involved in producing desired cinematic action sequences. Also, to decrease the training time required to learn piloting maneuvers, a user needs to see how an expert or teacher performs the desired maneuver. The present invention provides a quicker and more economical solution and overcomes the drawbacks of the existing methods and systems.

DISCLOSURE OF THE INVENTION

The invented method and system provides a high-quality motion simulation based on the sampled simulated motion of a piloted object or vehicle. Also, the invented method and system provides visual information to teach a user how to manipulate the object's controls to achieve the displayed motion. In the preferred embodiment of the invented method and system, the piloted object or vehicle is an aircraft and its motion is flying.

The invented computerized production method for simulating the motion of an object or vehicle includes piloting the object, periodically sampling various characteristics of the object while it is in motion, providing the sampled information to a processor, interpolating additional characteristics of the object that represent its motion and position between chronologically adjacent pieces of sampled information, and rendering an apparently smooth presentation of the object's motion. The invented method may also include presenting the control parameters used to produce such motion in order to teach a viewer how to manipulate the controls to achieve the desired motion.

The invented graphical production system for simulating the motion of an object or vehicle includes a piloting subsystem that controls the object's motion, a sampling subsystem to gather sampled information about the object's motion, and a processor to interpolate additional characteristics of the object that represent its motion and position between chronologically adjacent pieces of sampled information and to render a linear animation sequence based on the interpolated information. The linear animation sequence is intended to be displayed on a visual display device. The sequence may include the control parameters used to produce such motion in order to teach a viewer how to manipulate the controls to achieve the desired motion.

DETAILED DESCRIPTION AND BEST MODE FOR CARRYING OUT THE INVENTION

Figure 1:
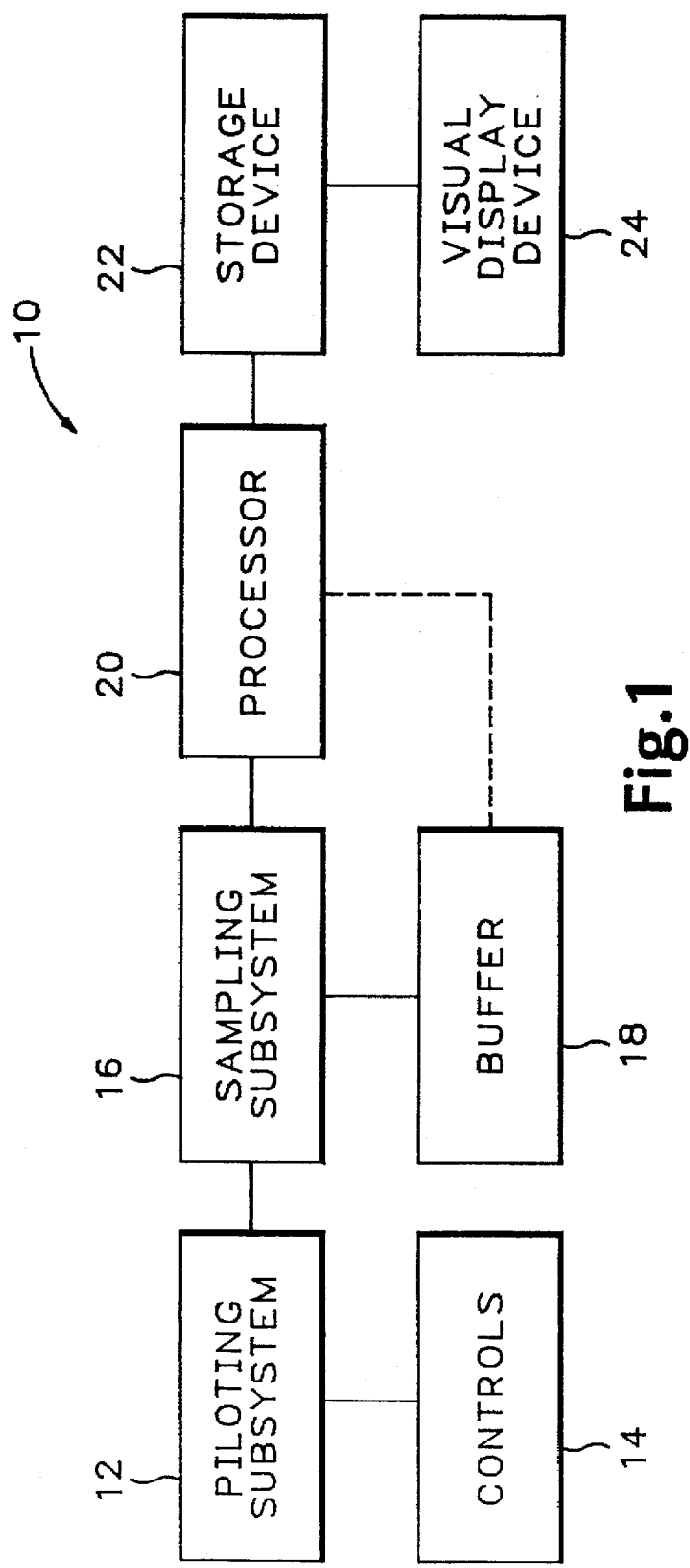
FIG. 1 is schematic overall view of the preferred embodiment of the invented computerized graphical production system.

In FIG. 1 the invented system, in accordance with its preferred embodiment, is generally indicated at 10. The invented system provides computerized motion animation based on the previously sampled motion of a piloted computer-generated object or vehicle.

An object or vehicle and its motion and operation is simulated or created by a computer. A user can control the object's simulated motion by using input controls or piloting controls. In the preferred embodiment of the invented system, the computer-generated object is an aircraft, namely, an airplane, and the simulated motion is flying. Such an airplane or other computer-generated object moves about in a computer-generated world. Although the computer-generated world may be a two-dimensional world, it typically is a three-dimensional world, or so-called "three-space." Those who are skilled in the art will appreciate that the computer-generated object may be any pilotable or controllable object operating in any multi-dimensional computer-generated world. The following is a non-exhaustive list of possible pilotable objects or vehicles operating in a computer-generated world that are within the spirit and scope of the invention: 1) a racing automobile operating on a track; 2) a land vehicle operating on any terrain; 3) a ship or boat on the surface of a body of water; 4) a submarine above and/or under the water; 5) an aircraft flying in the sky; and 6) a space travelling-vehicle hurling through so-called outer space.

In the preferred embodiment of the invented system, a computerized graphical production system is used to reproduce the simulation motion of an aircraft based on a previously sampled data set. The sampled data set is the result of sampling the computer-generated or computer-simulated motion of a computer-generated aircraft in a flight simulator or flight simulation game. As seen in FIG. 1, the system includes a piloting subsystem 12 with piloting or input controls 14. Such a piloting subsystem allows the user to pilot or operate the computer-generated aircraft using the controls and the user can see the aircraft's motion a video monitor that is part of the piloting subsystem. In the preferred embodiment, the piloting subsystem may include a computer (such as a microcomputer) running a flight simulation computer program, wherein the computer has a video monitor on which an aircraft's simulated flight is displayed.

Controls 14 affect the aircraft's motion and may include a joy stick, rudder control pedals and a throttle control or lever. The user may operate these controls using computer input devices such as a keyboard, joy stick, mouse, track ball or other input device. For the sake of clarity, a joy stick of an aircraft will hereinafter be labeled a "flight stick" to distinguish it from a computer's joy stick. In addition, a person using the piloting subsystem is hereinafter referred to as a "user" to distinguish the person from a "pilot", who is a person at the controls of a real or imagined aircraft.

The motion of the aircraft includes both translational and rotational motion within the three-space. Translational motion is motion from a first point in a three-space to a second point in a three-space, where the points might be described by Cartesian coordinates $(x_i, y_i, z_i)$. The rotational motion of an aircraft has three components: roll, pitch and yaw. Roll is rotation of the aircraft about the longitudinal axis of the aircraft's fuselage, e.g., the motion of the aircraft banking left or right. Pitch is rotation of the aircraft about an axis parallel to the longitudinal axis of the aircraft's wings, but perpendicular to the longitudinal axis of the fuselage, e.g., the motion of the aircraft climbing or diving. Yaw is the third element of the rotational motion. Yaw is the rotation of the aircraft about an axis perpendicular to both the wing's longitudinal axis and the fuselage's longitudinal axis, e.g., the rotational motion of the aircraft in response to a 45° cross wind.

The invented system also includes a sampling subsystem 16 that is operatively connected to the piloting subsystem. The sampling subsystem may be incorporated within the same microcomputer running a flight simulation program. The key function of sampling subsystem 16 is to periodically sample transient characteristics of the object to produce a sampled data set. Sampling subsystem 16 periodically gathers or samples information or data about the transient characteristics of the object to produce a sampled data set wherein each element of the sampled data set includes various transient characteristics that represent a moment-in-time of the object and its motion.

Over a given time frame, the sampling subsystem samples the transient characteristics of the object while the object is in motion at equal time intervals or equally spaced moments-in-time. The sampling rate must be fast enough that the information acquired by the sampling subsystem is sufficient to reproduce the aircraft's simulated motion. Such a rate is generally in the range of four to fourteen Hertz (Hz) but is most preferably in the range of eight to ten Hz.

Transient characteristics sampled by the sampling subsystem include any information about the object and its motion that may change from moment to moment as the object moves. Transient characteristics may include positional information, orientational information, translational information, rotational information, control information, and the like. Positional information may include the position of the aircraft in three-space (in other words, its $x_i$, $y_i$, and $z_i$ coordinates) and a viewer's position in three-space. The position of the camera, e.g. within the cockpit of a so-called "chase plane", defines the angle at which the viewer will see the object and its motion. Positional or translational information includes trajectorial information which defines the aircraft's three-space trajectory or vector. Orientational and rotational information includes attitudinal information of the aircraft, and the attitude of the aircraft is defined by the aircraft's roll, pitch and yaw.

Control information in the data set includes the control settings or parameters related to the airplane's motion and position. Such control parameters may include the position of the flight stick, the position of rudder pedal controls and the throttle or power settings. These controls affect various aerodynamic control surfaces on the aircraft that allows a pilot to control the three basic motions: pitch, roll and yaw. The key control surfaces on the aircraft are the elevators, the rudder, and the ailerons.

With regard to control information, the following discussion of an aircraft's various control parameters (including the control surfaces) will aid the reader's understanding of how an aircraft's controls affect the motion of the aircraft and hence, how the corresponding controls of the computer running a flight simulator affect the simulated motion of the computer-generated aircraft. The headings of the following four paragraphs will list an aircraft's controllable motion, the corresponding means that an aircraft has to cause the motion, an aircraft's flight control corresponding to the means and the preferred input device of the computer corresponding to an aircraft's means. The following heading format will be used to introduce each paragraph: Motion, means, flight control and input device.

Pitch, elevators, flight stick, and joy stick: The elevators are located on the aircraft's tail assembly and control the aircraft's pitch. When the elevators are moved down, the nose will pitch down and when the elevators are moved up, the nose will pitch up. The pilot controls the elevator with the flight stick. To nose the aircraft down, a pilot pushes forward on the flight stick, and by pulling back on the flight stick, the aircraft will pull its nose up. Preferably, a user of the computer can have the same effect on the computer-generated aircraft by using the joy stick.

Roll, ailerons, flight stick, and joy stick: The ailerons are located on the wings and control the rolling motion of the aircraft. When the left aileron is raised or lowered, the right aileron moves in the opposite direction. This action causes the aircraft to bank. Ailerons are controlled by the flight stick. To bank to the left, a pilot moves the flight stick to the left and to bank to the right, a pilot moves the flight stick to the right. Preferably, a user of the computer can have the same effect on the computer-generated aircraft by using the joy stick.

Yaw, rudder, rudder pedals, and keyboard: The rudder is located on the tail assembly and it controls the aircraft's yaw. The pilot can control the rudder using rudder foot pedal controls. When a pilot moves the rudder left or right, the aircraft's nose will yaw in the corresponding direction. Preferably, a user of the computer can have the same effect on the computer-generated aircraft by using the keyboard.

Speed, throttle, throttle control, and keyboard: The throttle controls the speed of the aircraft by controlling the rotation speed of the aircraft's propeller (and/or the pitch of its blades) or the thrust of the aircraft's jet engines. The pilot can control the speed of the aircraft using the throttle control. Preferably, a user of the computer can have the same effect on the computer-generated aircraft by using the keyboard.

Each element of the sampled data set describes a moment-in-time of the object based on the sampled transient characteristics at that moment-in-time. The sampled data set produced by the sampling subsystem may be saved or recorded in a buffer 18. Buffer 18 may be a volatile or static primary memory system (e.g., dynamic random access memory (DRAM)), removable media secondary storage system (e.g., a floppy disk), non-removable media secondary storage system (e.g., a hard drive), or other storage mechanisms. In the preferred embodiment, the sampled data set is saved as a file on a floppy disk or a network-accessible hard drive. Preferably, the sample data set is saved in a format known as "VCR script." The VCR scripts may be modified, edited or altered in a fashion analogous to modification of video tapes in a video cassette recorder (VCR) machine.

The invented system also includes a processor 20 that is operatively connected to sampling subsystem 16. Such operative connection may be through a physical electrical connection, or may be accomplished via buffer 18. For example, the sampled data set may be recorded onto a removable floppy disk or a network-accessible hard drive, and processor 20 may access the sampled data set from the floppy disk or the network-accessible hard drive.

Processor 20 may be any hardware, firmware, software or any combination thereof that is capable of effectively processing large amounts of numerical data and performing calculations on the numerical data. Preferably, the processor is a general or special purpose computer running a computer software program designed to accept the sampled data set and perform any necessary calculations using the sampled data set. If the sampled data set is in a format different than what the software expects, then the processor must perform an additional data formatting function to arrange the sampled data set into a format that the software expects.

Processor 20 creates an interpolated data set that represents the simulated motion of the object such that the motion is substantially continuous. The interpolated data set includes the elements from the sampled data set plus additional elements created by the processor. The processor creates these additional elements by interpolating transient characteristics of the object between the moments-in-time described by at least two chronologically adjacent elements in the sampled data set. For example, if a first element $E_T$ in the sampled data set describes transient characteristics at a first moment-in-time and a second element $E_{T+4}$ in the sampled data set describes the transient characteristics of the object at a second moment-in-time, then the additional elements produced by interpolation may be $E_{T+1}$, $E_{T+2}$ and $E_{T+3}$, where each additional element is chronologically between $E_T$ and $E_{T+4}$. Such interpolation may be linear or any other desired function.

Preferably, the interpolation is performed on the entire sampled data set. This means the interpolated data set will represent the same given time frame represented by the sampled data set, but additional moments-in-time between the moments-in-time described in the sampled data set are described in the interpolated data set. Thus, the motion of the aircraft across the sampled moments-in-time are described in the interpolated data set.

After interpolation, the processor creates a cinematic action sequence of the aircraft's flight based upon the interpolated data set. The resulting cinematic action sequence has multiple video frames that are combined together to produce a linear animation sequence or simply a "movie." In other words, the resulting cinematic action sequence is analogous to a movie.

Each element in the interpolated data set describes a moment-in-time and corresponds to one video frame of the linear animation sequence. The processor creates each video frame of the linear animation sequence based upon a view of a fictitious or computer-generated world in which the aircraft is located. The aircraft's position in each frame is determined by the information in the interpolated data set. The processor renders each video frame, thereby producing a two-dimensional representation of the three-dimensional computer-generated objects (including the aircraft) in the computer-generated world. When multiple frames have been rendered, the motion of the aircraft is simulated based upon the changing position and shape of the aircraft in each video frame. The frame rate (frames/second) of the linear animation sequence is the number of frames shown or designated for each second. In order to produce an apparently smooth graphical presentation, the linear animation sequence should have a frame rate preferably greater than ten frames/sec. Most preferably, the frame rate should be twelve or greater frames/sec. Of course, interpolation only needs to be performed when sampling rate is less than the frame rate of the sequence.

The invented system may include a storage device 22 and/or video display device 24. FIG. 1 shows that both devices are operatively connected to the processor. As seen in FIG. 1, the visual display device may be operatively connected to the processor via an operative connection with the storage system. The linear animation sequence produced by the processor is either directly displayed on visual display device 24 or it is stored in storage device 20 for later presentation on the visual display device. Visual display device 24 may be physically connected to the same computer system that includes the processor or it may be physically separated from the processor's computer system. If the visual display device is physically separated, then it may display the linear animation sequence by accessing it from the storage device. Storage device 22 can be a primary memory system, a removable or non-removable secondary storage system, a video tape, film, or any other device capable of storing the linear animation sequence. Ultimately, a stored linear animation sequence is intended to be viewed on the visual display device. If necessary, the format of the stored linear animation sequences may be modified so that the sequence can be viewed on the visual display device, especially if it is not physically part of the same computer system that includes the processor. Examples of systems that have a visual display device capable of presenting the linear animation sequence include a personal microcomputer, a minicomputer, a video cassette player, a film projector, any graphical computer or video system, etc.

The various elements of the invented system may be included into one computer or computer system or may be incorporated into multiple computers or computer systems. In the preferred embodiment, two computer systems are utilized. The first is a microcomputer system that includes piloting subsystem 12, controls 14, sampling subsystem 16 and buffer 18. The second computer system includes processor 20, storage device 22 and visual display device 24. Processor 20 obtains the previously sampled data set from sampling system 16 via buffer 18, where buffer 18 is a floppy disk or a network-accessible hard drive.

Figure 2:
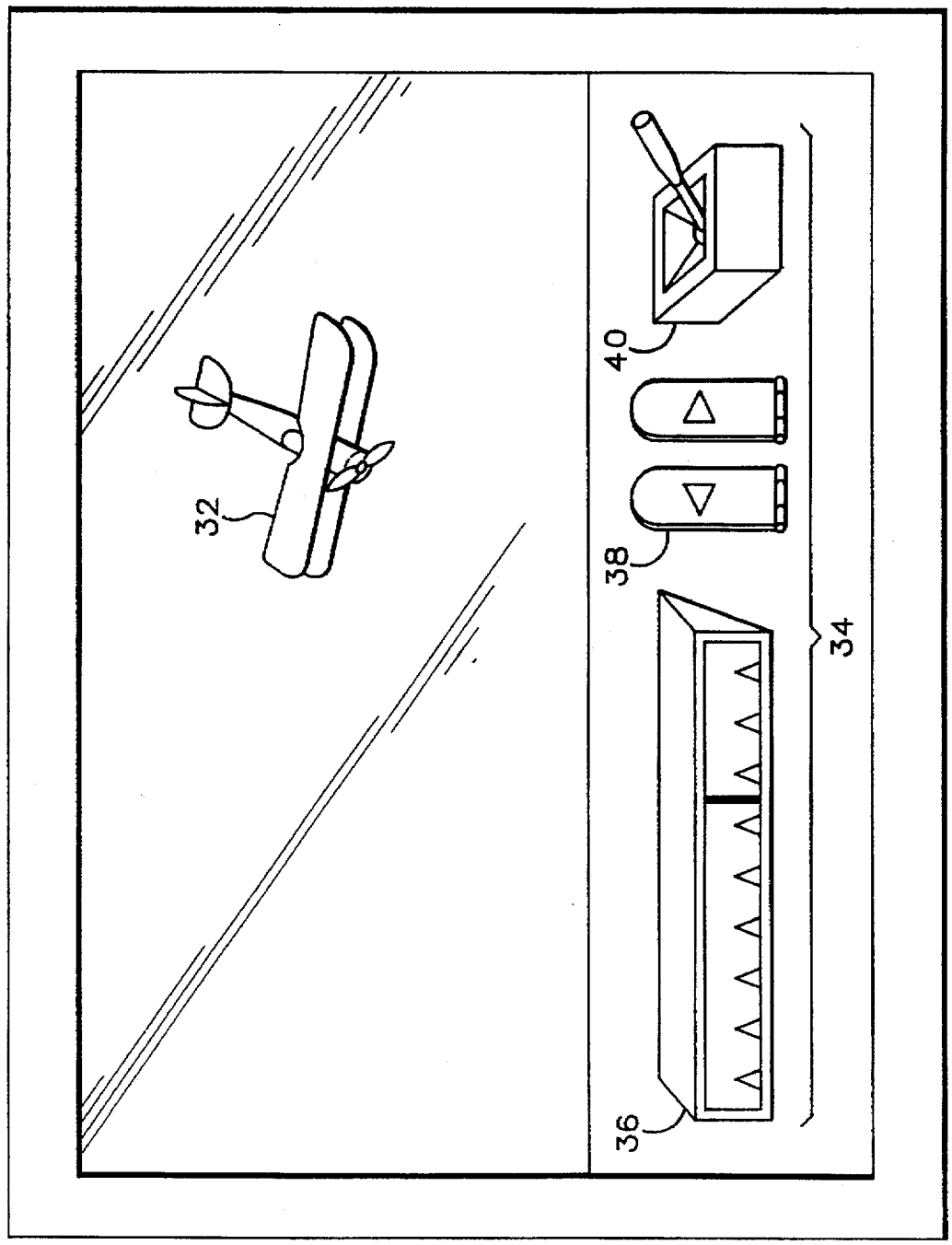
FIG. 2 is a view of a computer screen produced by the visual display device of the preferred embodiment of the invented system or utilizing the invented method. The screen is a frame of the cinematic sequence showing the object and its piloting controls.

FIG. 2 shows one frame of the linear animation sequence, along with the control parameters of the controls used to affect the aircraft's motion. FIG. 2 shows the screen of a visual display device generally indicated at 30. On the screen is a computer-generated airplane 32 along with a graphical representation of the airplane's controls which is generally indicated at 34. The controls preferably include a throttle indicator 36, rudder control pedals 38 and a fight stick 40 for controlling the plane's elevators and ailerons. The positioning or setting of each of the controls as depicted in FIG. 2 will change in each frame depending on the position and motion of airplane 32. The airplane's trajectory and attitude and the airplane's control parameters or settings were originally created by the piloting subsystem (e.g., a fight simulator) and sampled by the sampling subsystem. A visual display device presents a high-quality graphical presentation (or a cinematic action sequence) showing the airplane in motion with its accompanying control parameters.

The display of the control parameters along with the motion of the object allows a viewer quickly to learn the various maneuvers that each aircraft is capable of performing. The viewer is seeing how an expert flies an aircraft and thus, the viewer is, in effect, learning by seeing.

Figure 3:
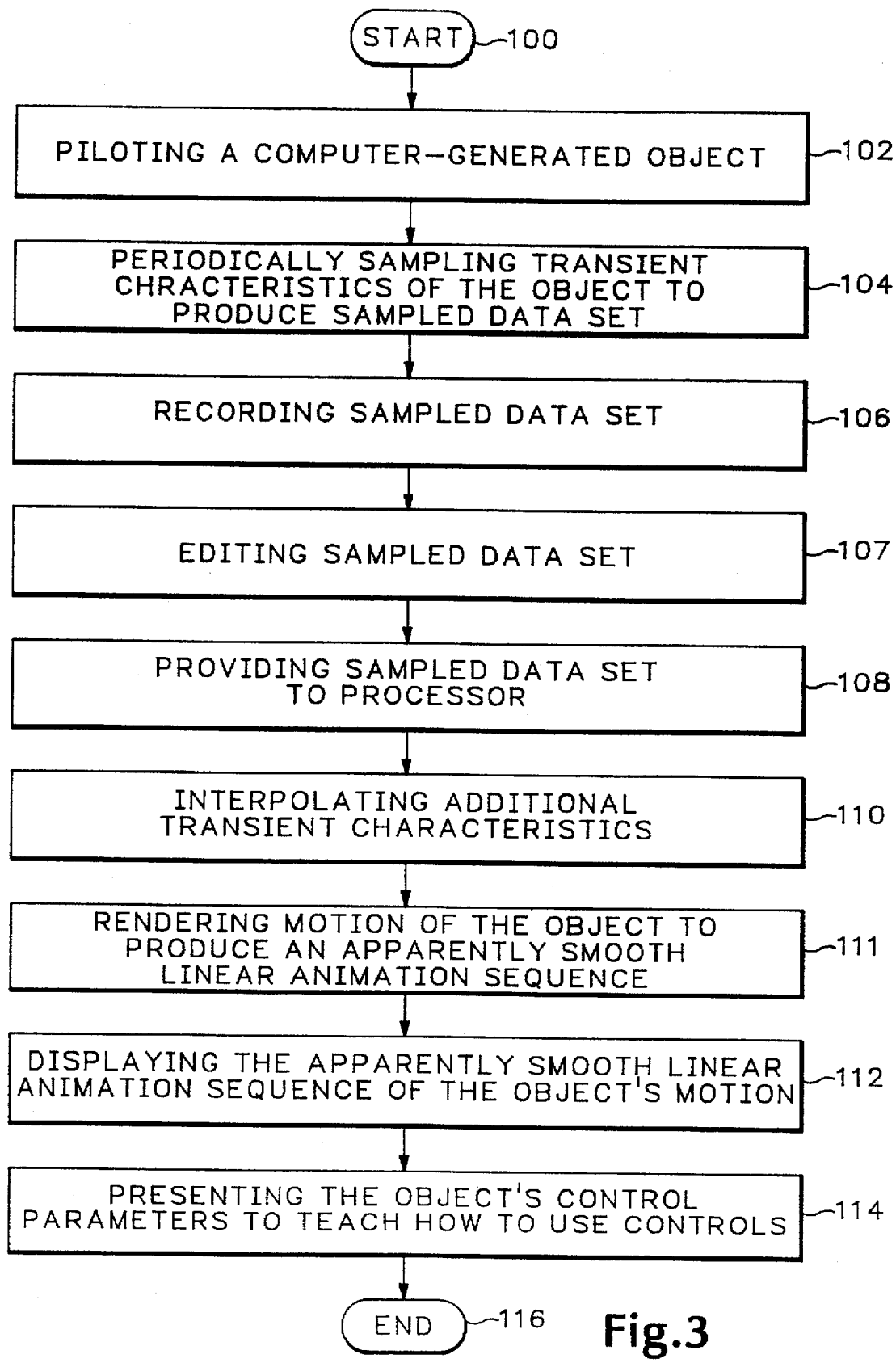
FIG. 3 is a flowchart showing the preferred embodiment of the invented computerized graphical production method.

FIG. 3 illustrates the preferred embodiment of the invented method. The invented method can be implemented on one or more general or special purpose computers. Preferably, the method is at least partially performed on a computer running a flight simulation program. In the preferred embodiment of the method, the object is an aircraft or airplane.

In FIG. 3, the method starts at 100. At 102, the computer-generated object is piloted by using controls that affect the object's simulated motion. The object is computer-generated and its motion is simulated. At 104, the transient characteristics of the object are periodically sampled for a given time frame, thereby producing the sampled data set which represents the object's motion during the given time frame. At 106, the sampled data set may be recorded in a buffer. At 107, the recorded sampled data set may be edited. At 108, the sampled data set is provided to a processor. The processor may be any hardware, firmware, software or any combination thereof that is capable of effectively processing large amounts of numerical data and performing calculations based upon the numerical data. Providing step 108 may include a conversion of the format in which the sampled data set is stored in the buffer. Such a conversion may be necessary if the equipment utilizing the interpolating step (described next) expects the sampled data set to be in a format different from its originally saved format.

Next, at 110, transient characteristics of the object between moments-in-time described by at least two chronologically adjacent elements in the sampled data set are interpolated. Such interpolation produces an interpolated data set that includes the sampled data set. The interpolated data set represents the motion of the object at such a time resolution such that the motion is substantially continuous. At 111, a computer-generated world and all of the objects in that world (including the object in motion) are rendered. Rendering step 111 produces an apparently smooth linear animation sequence of the object's motion in a computer-generated world. The object's position and orientation at any given moment-in-time is based upon the interpolated data set. At 112, an apparently smooth graphical presentation of the linear animation sequence is displayed. Also, at 114, the method may provide a teaching function by presenting the object's control parameters along with its corresponding motion to teach the viewer how to use the controls. The method ends at 116.

An advanced and novel computer motion-simulation or animation production system and method is provided by the invented system and method. The invented system and method reduce production costs by eliminating the time-consuming frame-by-frame animation of an object's motion and add an element of realism that was previously unavailable using traditional computer-aided animation techniques. In addition, the invented system and method provide a means of accurately representing the position and setting of various input or piloting controls along with the corresponding motion of the object. This allows a viewer quickly and easily to learn how to pilot an object such as an airplane by watching how an expert used the controls during an earlier expert flight simulation run.

INDUSTRIAL APPLICABILITY

The invented method and system now may be understood to provide a quick and economical processing system to produce realistic cinematic action sequences on a computerized graphical presentation system where such action is originally based on the motion of the computer-generated object in three-space. The object and method may also be used as a teaching tool to help students learn to become better pilots of objects such as airplane. The method and system is especially applicable to flight simulation and to sporting recreation systems.

While the preferred embodiment and best mode of the invention have been disclosed, variations and changes may be made without departing from the spirit and scope of the invention.

We claim:

1. A graphical production system comprising:
a piloting subsystem configured to control computer simulated transient characteristics of a computer generated object in response to user operable controls that affect the transient characteristics of the object, where the piloting subsystem is configured to generate and display to a user a first video sequence depicting the transient characteristics of the object, whereby a user can pilot the object using such controls while viewing the first video sequence;
a sampling subsystem operatively connected to the piloting subsystem for periodically sampling numerous times the transient characteristics of the object during piloting by the user to produce a sampled data set of numerous transient characteristic samples, where the transient characteristics include at least the position of the object; and
a processor operatively connected to the sampling subsystem for rendering at least one video frame corresponding to the transient characteristics of the object for each of a plurality of the numerous transient characteristic samples, the processor further being configured to store the rendered video frames to thereby create a second video sequence in the form of an animation sequence of numerous video frames depicting the computer simulated transient characteristics of the object.

2. The system of claim 1, wherein the processor is configured to interpolate transient characteristics of the object between sequential transient characteristic samples in the sampled data set for at least some of the transient characteristic samples to create an interpolated data set that includes additional transient characteristic samples between sequential samples of the sampled data set.

3. The system of claim 1 further comprising a storage device operatively connected to the processor, wherein the device is for storing the second video sequence so that the second video sequence may be later displayed on a visual display device.

4. The system of claim 1 further comprising a visual display device operatively connected to the processor for displaying the second video sequence.

5. The system of claim 1, wherein the transient characteristics include control parameters corresponding to the use of the controls that affect the object's transient characteristics and wherein the second video sequence includes a presentation of the controls so that the control parameters can be displayed on a visual display device to teach a viewer how to manipulate the controls to achieve the motion of the object depicted in the second video sequence.

6. The system of claim 1, wherein the transient characteristics include positional and orientational information.

7. The system of claim 1, wherein the object is an aircraft and the object's simulated transient characteristics simulate flying.

8. The system of claim 1 further comprising a buffer operatively connected to the sampling subsystem and the processor, wherein the sampled data set is stored in the buffer by the sampling subsystem and is accessed from the buffer by the processor.

9. A method for producing an animation sequence of numerous video frames, the method comprising:
generating a sampled data set by:
providing a piloting subsystem configured to control computer simulated transient characteristics of a computer generated object in response to user operable controls, where the transient characteristics of the object include, at least, its position;
operating the piloting subsystem by a user to affect the transient characteristics of the objects, where, during the step of operating, the piloting subsystem displays a first video sequence depicting, at least, the current position of the object to the user so that the user can monitor the motion of the object while affecting the transient characteristics, where the motion is the changing position of the object;
periodically sampling the transient characteristics of the object numerous times during the step of operating; and
storing the numerous transient characteristic samples, where the numerous transient characteristic samples make up the sampled data set; and
after generating the sampled data set then:
rendering at least one video frame corresponding to the transient characteristics of the object for a plurality of the transient characteristic samples; and
storing the rendered video frames corresponding to the simulated transient characteristics of the computer generated object for later sequential playback.

10. The method of claim 9, wherein the first video sequence is of a relatively lower quality than the quality of the rendered video frames.

11. The method of claim 9, wherein the first video sequence has a lower refresh rate than the rendered video frames.

12. The method of claim 9 further comprising the step of sequentially displaying the stored rendered video frames on a visual display device.

13. The method of claim 12, wherein the transient characteristics include control parameters corresponding to the use of the controls that affect the transient characteristics of the object and further comprising the step of presenting the control parameters concurrent with the displaying step to teach a viewer how to manipulate the controls to achieve the motion of the object as displayed in the sequentially displaying step.

14. The method of claim 9 further comprising the step of interpolating the transient characteristics of the computer generated object between sequential transient characteristic samples in the sampled data set for at least some of the transient characteristic samples to create an interpolated data set that includes additional transient characteristic samples between sequential samples of the sampled data set.

15. The method of claim 9, wherein the transient characteristics include positional and orientational information.

16. The method of claim 15, wherein the orientational information includes yaw, pitch and bank.

17. The method of claim 9, wherein the object is an aircraft and the piloting subsystem is a flight simulator and the motion corresponds to flight of the aircraft.

18. The method of claim 9 further comprising the step of editing the sampled data set prior to the step of rendering.

19. The method of claim 9, wherein the piloting subsystem is configured to control the computer simulated transient characteristics of the computer generated object generally in accordance with physical laws.

20. The method of claim 19, wherein the physical laws include the physics of flight.

* * * * *